April 3, 1962 R. M. KING 3,028,150

AERATION MEANS

Filed March 30, 1959

INVENTOR,
RALPH M. KING
BY Weatherford & Weatherford
Attys

United States Patent Office 3,028,150
Patented Apr. 3, 1962

3,028,150
AERATION MEANS
Ralph M. King, Stuttgart, Ark., assignor to Layne-Arkansas Company, Stuttgart, Ark., a corporation of Arkansas
Filed Mar. 30, 1959, Ser. No. 802,762
8 Claims. (Cl. 261—24)

This invention relates to certain new and useful improvements in means and devices for aerating water, particularly for the purpose of removing gases, such as carbon dioxide, hydrogen sulfide, and other unpleasant gases, from water in which they may be carried or entrained in order that the water may be preliminarily treated and de-gasified for pleasant human consumption.

The present invention is adapted to provide a compact and relatively inexpensive device for the purpose of so aerating water passed therethrough for treatment as substantially to eliminate all of the gases entrained with the water which is under treatment, the device of the present invention being of a relatively inexpensive character, and being of a highly efficient nature.

A number of attempts have been made heretofore to provide for the aeration of water desired for consumption, and these prior attempts have taken many variations in approach. Substantially uniformly they have resulted in devices of a substantially cumbersome nature which have proven to be relatively inefficient in the accomplishment of the desired purpose of eliminating from the water entrained undesirable gases therein, and have in large measure proven to be commercially unsuccessful.

The present invention is primarily based upon the principle of initially finely diffusing an intake of water with which undesired gases are entrained, dispelling the finely diffused water against divider elements in successive pattern in order that the diffused portions may be yet further divided, thus effectively presenting the gases for separation from the carrying water through the passage of a flow of air therethrough.

The present invention envisages the discharge of a flow of air through a tortuous pathway passing through the water which has been diffused and divided together with its entrained gases in order that the tortuously proceeding air may pick up the gases released due to the break up of the fluid as it is treated in the device and to carry the gases thus separated from the fluid to discharge under the influence of the flow of air.

The principal object of the present invention is to provide means for aerating water for the purpose of eliminating undesirable gases entrained or carried therein in which the water together with the gases is discharged within a housing onto a substantially horizontally disposed motor driven impeller having upstanding diffuser fins, the impeller and its upstanding diffuser fins being adapted to discharge the water laterally in the form of a diffused spray against a series of cylindrical screen or mesh cylinders for successively thoroughly dividing the water into minute particles for superiorly releasing any gas that might be entrained therewith.

A further object of the invention is to provide an aeration device comprising an external housing with an upper discharge portion for gaseous elements, and having a motor driven discharge fan or blower carried conjointly upon a shaft with an impeller adapted to receive an intake of water and to discharge same laterally against divider elements.

A further object of the invention is to provide such a device in which the motor mechanism together with its driven parts, including the blower and the impeller as well as the water intake system, are separable as a unit from the housing for removal.

A further object of the invention is to provide such a device in which the intake of water is discharged through a ported disc onto a rotatable impeller for outward casting against divider elements.

A further object of the invention is to provide such an aeration device in which the divider elements comprise a series of concentric mesh cylinders.

A further object of the invention is to provide such a device in which the concentric mesh cylinders are spaced at reducing spacings outwardly from the center of the device.

A further object of the invention is to provide such a device having a nest of mesh cylinders in which the mesh cylinders include a series of baffles which are adapted to divert a flow of air through the cylinders into a tortuous pathway in order to further agitate the flow of air through the water divided by the system.

A further object of the invention is to provide in general an improvement in the design, construction and efficiency of devices for aerating water for human consumption.

The means by which the foregoing and other objects of the present invention are accomplished and the manner of their accomplishment will be readily understood from the following specification upon reference to the accompanying drawings, in which.

Figure 1:
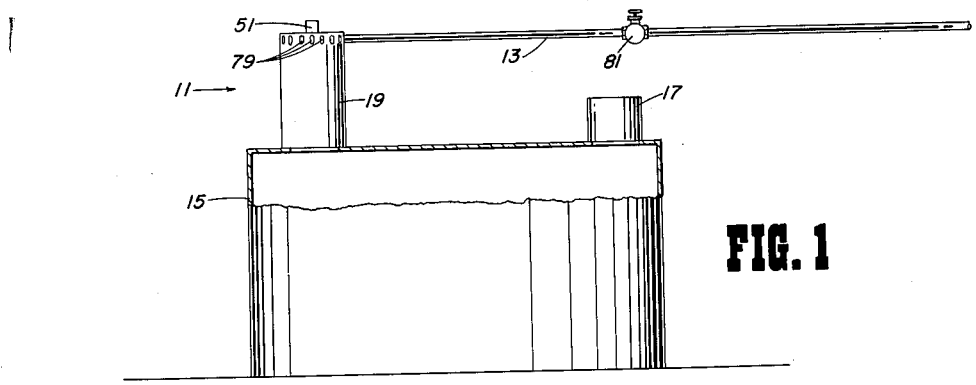
FIG. 1 is a front elevational view of a typical installation of the aerator of the present invention upon a reservoir with parts broken away for purposes of illustration.

Referring now to the drawings in which the various parts are indicated by numerals, the present invention comprises an aeration device 11 which is adapted to receive, from a suitable source of supply (not shown), as through a pipe 13, water which is intended to be subjected to treatment in the aeration device. Aerator 11 is preferably an open bottomed device which is adapted to be mounted in flow communication with an accumulator which may be in the form of a reservoir 15, although it will be understood that other forms of accumulation means may be employed in conjunction with aerator 11 without departing from the present invention.

As will become apparent hereinafter, air is to be drawn or forced through aerator 11, and it is desirable that such air should pass through filter means in order to eliminate therefrom unnecessary outside materials in the air prior to acting upon the water to be treated in the aerator. In the embodiment as shown in FIG. 1, filter means 17 are shown as mounted on reservoir 15, and the filter means 17 provide the means for the entrance of air into the system for subsequent passage through aerator 11. It will again be understood that suitable filter means, such as, for example, of the nature of the air filter means employed in conventional air conditioning machines, may be employed in conjunction with aerator 11, and that the same may be mounted in conjunction with the aerator means specifically, or may be separated therefrom as indicated in FIG. 1.

Aerator 11 essentially comprises an external housing made up principally of a shell 19. Shell 19 is substantially cylindrical and is adapted to house substantially all of the instrumentalities involved in aerator 11. Adjacent its lower end shell 19 is preferably provided with an annular seat 21 which is disposed substantially horizontally and extends inwardly of shell 19 a minor distance only. Adjacent its inner edge seat 21 is preferably provided with a depending flange 23 which is of circular cross section. It will be seen that the annular seat 21 is rigidly fixed to shell 19, preferably as by welding projects substantially horizontally therein providing a substantially horizontal annular shelf, with the shelf terminating at depending flange 23 and defining a downwardly unobstructed opening 25 of substantially large diameter.

Figure 4:
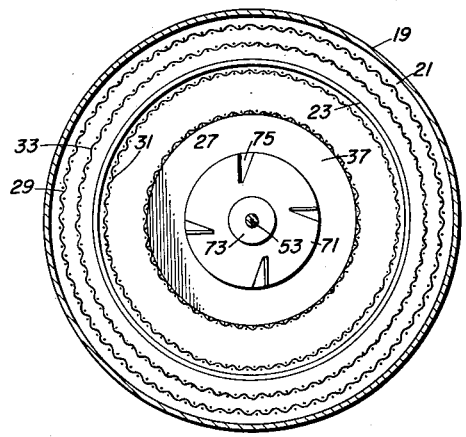
FIG. 4 is a sectional plan view taken as on the line IV—IV of FIG. 2.

Seat 21 is provided to support the divider means preferably used in the present invention. These divider means comprise a plurality of concentrically nested cylinders formed of coarse mesh, such as hardware cloth. These mesh cylinders, as shown best in FIGS. 2 and 4, comprise an inner mesh cylinder 27, an outer mesh cylinder 29, and intermediate mesh cylinders 31, 33. The nest of mesh cylinders at their upper ends are connected together to form a divider unit, a connector ring 35 being seated upon and rigidly fixed to the upper ends of the respective mesh cylinders.

Ring 35 is substantially horizontal and its outside diameter is such as to slidably fit within the interior of shell 19 to provide for insertion and removal of the nest of mesh cylinders into and from shell 19. Ring 35 is centrally open, the ring preferably having a central passageway of diameter substantially equal to the internal diameter of inner mesh cylinder 27. The nest of mesh cylinders is of a height less than the overall height of shell 19, and thus terminates intermediate the height of the shell, preferably being of a height slightly in excess of half the height of the shell. Intermediate the extent of inner mesh cylinder 27 of the nest of cylinders a disc-like baffle 37 is rigidly fixed to the interior of mesh cylinder 27, effectively maintaining the cylinder in its cylindrical shape and additionally serving as a baffle for the diversion of air flow.

In the preferred embodiment as shown in the present drawings, the spacing between the respective nested mesh cylinders progressively reduces proceeding outwardly through the nest. Thus intermediate mesh cylinder 31 is spaced more greatly from inner mesh cylinder 27 than is mesh cylinder 31 from the other intermediate mesh cylinder 33, and in turn, intermediate mesh cylinder 33 is spaced from outer mesh cylinder 39 a distance less than the other spacings. It additionally will be seen that outer mesh cylinder 29 is spaced inwardly from shell 19 and is secured to connector ring 35 at a point spaced inwardly from the periphery of the connector ring.

While the primary purpose of seat 21 is that of providing a bottom support for the accumulated nest of mesh cylinders which are removably inserted into shell 19, it will be seen that seat 21 also provides a baffle means for diverting air flow so as to flow upwardly into aerator 11 through lower opening 25. Additionally connector ring 35 at the top of the nest of mesh cylinders not only serves to connect the cylinders together, but also serves as a baffle to divert air flow to pass upwardly through the open upper end of inner mesh cylinder 27.

These divider means, comprising essentially the nested mesh cylinders and their connecting ring and baffle means, are removably mounted in the lower portion of shell 19, although under certain circumstances it may be desired to have connector ring 35 rigidly fixed to shell 19 in order permanently to fix the nest of mesh cylinders within the lower end of the shell.

Figure 2:
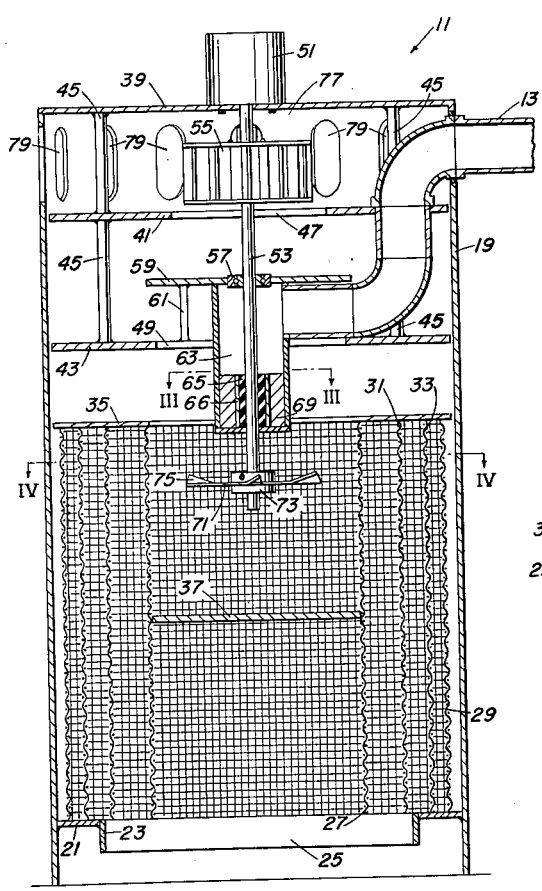
FIG. 2 is a vertical view, partly in section and partly in elevation on an enlarged scale, of the aerator device of the present invention.
Figure 3:
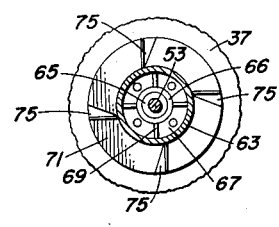
FIG. 3 is a fragmentary sectional plan view taken as on the line III—III of FIG. 2.

In the upper portion of shell 19 are mounted the diffuser and discharge means of the present invention, and preferably these latter means are combined together into a removable unit removably mounted in the shell. These latter means are essentially supported by and mounted upon a cage consisting of a top 39 adapted to overlie the upper portions of shell 19 and to mate therewith in order to effect upward closure of the shell. Connected with top 39 and successively spaced therebelow are an intermediate plate 41 and a lower plate 43, top 39 and plates 41, 43 being preferably interconnected as by hanger rods 45, which rods are respectively rigidly fixed to each of the members 39, 41, 43, preferably as by welding, so as to dispose the top and plates in spaced apart relation as best shown in FIG. 2.

Plates 41, 43 are preferably of a diameter slightly less than the internal diameter of shell 19 in order to slidably be fitted into the shell with the top 39 seating upon the upper end of the shell to effect closure of the shell and also support of the plates therefrom. Each of the plates 41, 43 is centrally apertured as at 47, 49 to provide for the passage of airflow through the device, and also to accommodate the other instrumentalities of the diffuser means to be described, the apertures 47, 49 in plates 41, 43 being of successively reducing diameters somewhat less than the diameter of the inner mesh cylinder 27. Thus aperture 49 in lower plate 43 is of slightly less diameter than the open upper end of cylinder 27, while the aperture 47 in plate 41 is of substantially smaller diameter than the open upper end of cylinder 27, and is of somewhat smaller diameter than is the diameter of aperture 49.

Mounted on and secured to the upper surface of top 39 is a motor 51 to which is connected a shaft 53, shaft 53 being driven by motor 51 and extending downwardly through top 39 and plate apertures 47, 49 into the upper portion of the nested mesh cylinders, being disposed substantially along the vertical axial center of the arrangement. Between top 39 and plate 41 a centrifugal blower 55 is fixed to shaft 53 and is driven therewith. Blower 55 is substantially centered over aperture 47 for better inducing flow of air upwardly through aperture 47.

Shaft 53, between plates 41, 43, is journalled in a bearing 57 carried in a disc-like baffle plate 59, baffle 59 being disposed intermediate plates 41, 43 and being substantially parallel with the plates. Baffle 59 is of a diameter slightly in excess of the diameter of aperture 49 in order to radially deflect flow of air upwardly through aperture 49, and baffle 59 is preferably connected to plate 43 as by one or more connector rods 61 which are rigidly fixed to the baffle and the plate and extend therebetween.

Depending below baffle 59 is a substantially cylindrical intake chamber 63 which surrounds shaft 53 and which in its lower portion is provided with a rubber bearing 65 in which the shaft is journalled, the bearing 65 being supported in a sleeve 66, and at its lower end chamber 63 terminates in a ported plate 67. Preferably the lower portion of chamber 63 is divided into segments by divider walls 69, which connect with sleeve 66. The lower end of intake chamber 63 extends downwardly slightly into the nest of mesh cylinders so that ported plate 67 is positioned slightly below the upper edge of the nested mesh cylinders in order to insure gravity discharge of water delivered into the intake chamber within the divider means.

Spaced below plate 67 of chamber 63, and fixed adjacent the lower end of shaft 53, is a substantially horizontally disposed impeller 71 having a central hub 73 by which impeller 71 is fixed to shaft 53, the impeller being a substantially disc-like member including a plurality of upwardly bent fins 75, the fins preferably being integral with impeller 71 and may be formed by substantially radially slotting the impeller plate and upwardly folding the material adjacent to the cut. Fins 75 are disposed adjacent the periphery of impeller 71 and are preferably of substantially triangular shape, and are circumferentially spaced apart about the periphery of the impeller.

Intake of water to be treated in the device is delivered into intake chamber 63 through intake pipe 13, shell 19 being cut out adjacent its upper end to receive the introduction of pipe 13 into its interior, the pipe curving downwardly, passing through plate 41 and into the upper portion of chamber 63 slightly above plate 43.

When the device is assembled with top 39 seated on the upper portion of shell 19, and the instrumentalities carried by the top being positioned within the shell, plate 41 defines an upper discharge chamber 77, and the shell around the discharge chamber is provided with a plurality of gas discharge vents or openings 79. It will be observed that blower 55 is housed within discharge chamber 77 and is in adjacency to vents 79 so as to facilitate discharge of air moved by the blower outwardly through the vents.

In the use of the device, after it has been mounted upon a suitable accumulator such as the reservoir 15, and after it has been assembled with the nested mesh cylinders mounted in the lower portion thereof, and the top and instrumentalities carried thereby mounted upon and in the upper portion of the shell, air flow is induced to flow through the filter means into the lower portion of the aerator by operation of blower 55. It will be seen that the air flow drawn in through lower opening 25 is diverted somewhat inwardly by the depending flange 23 and seat 21, then impinges against baffle plate 37, causing outward diversion of the air flow to pass outwardly through the mesh cylinders and to circulate therethrough, being then confined to pass upwardly within the opening forming the central portion of ring 35. As the air flow is passed further upwardly, passing through aperture 47, it again impinges a baffle plate and is diverted outwardly by baffle 59. Thereafter the air flow passes through aperture 49 into blower 55 and is discharged through vents 79.

While this air flow is in progress intake of water into the aerator through pipe 13 may be begun. Simultaneously with the operation of blower 55, impeller 71 is being rotated by the common shaft 53 driven by motor 51. Water discharging through pipe 13 discharges into intake chamber 63 and flows downwardly therethrough, passing out the ports in bottom plate 67, dropping directly onto the central portion of the rapidly rotating impeller 71. The water thus discharging onto impeller 71 is centrifugally moved outwardly along the impeller, and as it reaches fins 75 is deflected upwardly and broken into a spray and is discharged outwardly against the upper portions of the mesh cylinders, successively passing through the mesh cylinders so that the water diffused into the form of a spray by the impeller is caused to be further divided as it successively passes through the mesh cylinders.

The spacing between the cylinders is of importance as the successive division of the water portions diffused by the impeller reduces successively the size of such particles with the necessity that the spacing between the cylinders is successively reduced outwardly through the nest of mesh cylinders.

With the water thus finely diffused and divided, the flow of air, passing tortuously through the mesh cylinders and upwardly through the nest of cylinders to discharge out of discharge chamber 77, is enabled to mingle satisfactorily with the finely divided and diffused water particles, the breaking up of the water stream effectively releasing gaseous elements entrained with the water and enabling these released gaseous elements to be picked up by the flow and carried outwardly to discharge from the aerator.

Thus it will be seen that as the water thus acted upon by the air flow flows to the bottom of the aerator and thence to the accumulator, that it will have been subjected to an air scrubbing which has proven to be highly effective in substantially eliminating noxious or undesirable gaseous matters entrained with such water under treatment.

It will further be seen that, in view of the removable units which are included in the device, in the event of the necessity of repairs, replacements, cleaning or other problems, the device may quickly be dismantled and such operations effected, and as quickly reassembled.

It will be understood that motor 51 is preferably a variable speed motor, it being found that due to variations in the gaseous content of water in differing localities that the duration and volume of aeration should be varied. Additionally, while in the preferred embodiment the drive means for the blower and impeller have been described as comprising motor 51, other drive means, such as a belt drive, engine drive or gear drive, may be substituted without departing from the present invention.

In addition it is preferred that the volume of water intake should be variable and controllable, and for that purpose flow control means, such as a valve 81, may be mounted in intake pipe 13 in order to provide for control of the rate of flow through pipe 13 to aerator 11.

I claim:

1. Means for aerating water comprising an imperforate shell having an open bottom, a plurality of upright mesh cylinders supported within the lower part of said shell, said mesh cylinders being spaced apart and being of substantially equal height, a baffle ring connected to the upper ends of said cylinders, fixed baffle means respectively associated with said mesh cylinders, said baffle means including a lower peripheral baffle supporting said mesh cylinders and confining upward air flow toward the vertical center of said nest, an intermediate imperforate disc rigidly fixed to and spanning the interior of the innermost of said mesh cylinders and diverting upward air flow to pass outwardly through the mesh of said cylinders in a tortuous pathway upwardly and outwardly through said mesh cylinders, whereby to define a mesh cylinder unit, a top closing the upper end of said shell, a motor mounted on said top, an elongated shaft driven by said motor and depending into said shell to extend at its lower end into the upper part of said mesh cylinders, a substantially horizontally disposed impeller fixed to said shaft adjacent said shaft lower end and supported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders, said intake means discharging onto the upper surface of said impeller, motor drive of said impeller diffusing water discharged thereon and casting said diffused water against said mesh cylinders for further dividing, said diffused and divided water being subjected to said air flow for removal of entrained gases therefrom to discharge from said discharge chamber.

2. Means for aerating water comprising an imperforate shell having an open bottom, a plurality of upright mesh cylinders supported within the lower part of said shell, said mesh cylinders being spaced apart and being of substantially equal height, a baffle ring connected to the upper ends of said cylinders, fixed baffle means respectively associated with said mesh cylinders, said baffle means including a lower peripheral baffle supporting said mesh cylinders and confining upward air flow toward the vertical center of said nest, an intermediate imperforate disc rigidly fixed to and spanning the interior of the innermost of said mesh cylinders and diverting upward air flow to pass outwardly through the mesh of said cylinders in a tortuous pathway upwardly and outwardly through said mesh cylinders, whereby to define a mesh cylinder unit, a top closing the upper end of said shell, a motor mounted on said top, an elongated shaft driven by said motor and depending into said shell to extend at its lower end into the upper part of said mesh cylinders, a substantially horizontally disposed impeller fixed to said shaft adjacent said shaft lower end and supported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders, said intake means discharging onto the upper surface of said impeller, said impeller including a plurality of fins extending angularly upwardly from the upper surface of the impeller, motor drive of said impeller and its fins diffusing water discharged thereon and casting said diffused water against said mesh cylinders for further dividing, said diffused and divided water being subjected to said air flow for removal of entrained gases therefrom to discharge from said discharge chamber.

3. Means for aerating water comprising an imperforate shell having an open bottom, a plurality of concentrically nested upright mesh cylinders supported within the lower part of said shell, said mesh cylinders being spaced apart and being of substantially equal height, a baffle ring connected to the upper ends of said cylinders, fixed baffle means respectively associated with the upper and lower ends and intermediate the height of said mesh cylinders, said baffle means including a lower peripheral baffle supporting said mesh cylinders and confining upward air flow toward the vertical center of said nest, an intermediate imperforate disc rigidly fixed to and spanning the interior of the innermost of said mesh cylinders and diverting upward air flow to pass outwardly through the mesh of said cylinders in a tortuous pathway upwardly and outwardly through said mesh cylinders, whereby to define a mesh cylinder unit, a top closing the upper end of said shell, a motor mounted on said top, an elongated shaft driven by said motor and depending into said shell to extend at its lower end into the upper part of said nested mesh cylinders, a substantially horizontally disposed impeller fixed to said shaft adjacent said shaft lower end and supported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell and supported from said top adjacent and above the upper ends of said mesh cylinders, said intake means discharging onto the upper surface of said impeller, said impeller including a plurality of fins extending angularly upwardly from the upper surface of the impeller, motor drive of said impeller and its fins diffusing water discharged thereon and casting said diffused water against said mesh cylinders for further dividing, said diffused and divided water being subjected to said air flow for removal of entrained gases therefrom to discharge from said discharge chamber.

4. Means for aerating water comprising a substantially cylindrical imperforate shell having an open bottom, a plurality of concentrically nested upright mesh cylinders removably supported within the lower part of said shell, said mesh cylinders being spaced apart with the spacing between said mesh cylinders progressively reducing outwardly from the center of the nest of said mesh cylinders, substantially horizontal baffle means respectively associated with the upper and lower ends and intermediate the height of said mesh cylinders, said baffle means including a lower peripheral baffle supporting said mesh cylinders and confining upward air flow toward the vertical center of said nest, an intermediate imperforate disc rigidly fixed to and spanning the interior of the innermost of said mesh cylinders and diverting upward air flow to pass outwardly through the mesh of said cylinders in a tortuous pathway upwardly and outwardly through said mesh cylinders, said mesh cylinders being of substantially equal height, said baffle means associated with the upper ends of said cylinders comprising a connector ring connected to the upper ends of said cylinders and removable therewith, whereby to define a removable mesh cylinder unit, a top removably closing the upper end of said shell, a motor mounted on said top, an elongated shaft connected to and driven by said motor and depending into said shell to extend at its lower end into the upper part of said nested mesh cylinders, a substantially horizontally disposed impeller fixed to said shaft adjacent said shaft lower end and supported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders and supported from said top, said top, motor, shaft and intake means comprising a unit removable from said shell, said intake means discharging onto the upper surface of said impeller, said impeller including a plurality of fins extending angularly upwardly from the upper surface of the impeller, motor drive of said impeller and its fins diffusing water discharged thereon and casting said diffused water against said mesh cylinders for further dividing, said diffused and divided water being subjected to said air flow for removal of entrained gases therefrom to discharge from said discharge chamber.

5. Means for aerating water comprising a substantially cylindrical imperforate shell having an open bottom, a plurality of concentrically nested upright mesh cylinders removably supported within the lower part of said shell, said mesh cylinders being spaced apart with the spacing between said mesh cylinders progressively reducing outwardly from the center of the nest of said mesh cylinders, baffle means respectively associated with the upper and lower ends and intermediate the height of said mesh cylinders, said baffle means including a lower peripheral baffle supporting said mesh cylinders and confining upward air flow toward the vertical center of said nest, an intermediate imperforate disc rigidly fixed to and spanning the interior of the innermost of said mesh cylinders and diverting upward air flow to pass outwardly through the mesh of said cylinders in a tortuous pathway upwardly and outwardly through said mesh cylinders, said mesh cylinders being of substantially equal height, said baffle means associated with the upper ends of said cylinders comprising a connector ring connected to the upper ends of said cylinders and removable therewith, whereby to define a removable mesh cylinder unit, a top removably closing the upper end of said shell, a motor mounted on said top, an elongated shaft driven by said motor and depending into said shell to extend at its lower end into the upper part of said nested mesh cylinders, a substantially horizontally disposed impeller fixed to said shaft adjacent said shaft lower end and suported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders and supported from said top, said top, motor, shaft and intake means comprising a unit removable from said shell, said intake means discharging onto the upper surface of said impeller, motor drive of said impeller diffusing water discharged thereon and casting said diffused water against said mesh cylinders for further dividing, said diffused and divided water being subjected to said air flow for removal of entrained gases therefrom to discharge from said discharge chamber.

6. Means for aerating water comprising a substantially cylindrical imperforate shell having an open bottom, a plurality of concentrically nested upright mesh cylinders supported within the lower part of said shell, said mesh cylinders being spaced apart with the spacing between said mesh cylinders progressively reducing outwardly from the center of the nest of said mesh cylinders, fixed baffle means respectively associated with the upper and lower ends and intermediate the height of said mesh cylinders, said baffle means defining a tortuous pathway for air flow upwardly and outwardly through said mesh cylinders, said mesh cylinders being of substantially equal height, said baffle means associated with the upper ends of said cylinders comprising a connector ring connected to the upper ends of said cylinders, whereby to define a mesh cylinder unit, a top removably closing the upper end of said shell, a motor mounted on said top, an elongated shaft driven by said motor and depending into said shell to extend at its lower end into the upper part of said nested mesh cylinders, a substantially horizontally disposed impeller fixed to said shaft adjacent said shaft lower end and supported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders and supported from said top, said top, motor, shaft and intake means comprising a unit removable from said shell, said intake means discharging onto the upper surface of said impeller, motor drive of said impeller diffusing water discharged thereon and casting said diffused water against said mesh cylinders for further dividing, said diffused and divided water being subjected to said air flow for removal of entrained gases therefrom to discharge from said discharge chamber.

7. Means for aerating water comprising an imperforate shell having a lower opening for receiving air flow, a plurality of nested upright mesh cylinders supported within the lower part of said shell, fixed baffle means respectively associated with the upper and lower ends and intermediate the height of said mesh cylinders, said baffle means defining a tortuous pathway for air flow upwardly and outwardly through said mesh cylinders, said mesh cylinders being of substantially equal height, said baffle means associated with the upper ends of said cylinders comprising a connector ring connected to the upper ends of said cylinders, whereby to define a mesh cylinder unit, a top closing the upper end of said shell, an elongated shaft supported from said top and depending into said shell to extend at its lower end into the upper part of said nested mesh cylinders, variable speed drive means drivingly coupled to said shaft, a substantially horizontally disposed impeller fixed to said shaft adjacent said shaft lower end and supported within the upper part of said mesh cylinders, plate means connected with said top and defining a gas discharge chamber adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders, said intake means discharging onto said impeller, drive of said impeller diffusing water discharged thereon and casting said diffused water against said mesh cylinders for further dividing, said diffused and divided water being subjected to said air flow for removal of entrained gases therefrom to discharge from said discharge chamber.

8. Means for aerating water comprising an imperforate shell having a lower opening for receiving air flow, a plurality of nested upright mesh cylinders supported within the lower part of said shell, fixed baffle means respectively associated with the upper and lower ends and intermediate the height of said mesh cylinders, said baffle means defining a tortuous pathway for air flow upwardly and outwardly through said mesh cylinders, said mesh cylinders being of substantially equal height, said baffle means associated with the upper ends of said cylinders comprising a connector ring connected to the upper ends of said cylinders, whereby to define a mesh cylinder unit, a top closing the upper end of said shell, an elongated shaft depending into said shell to extend at its lower end into the upper part of said mesh cylinders, drive means connected to said shaft, a substantially horizontally disposed impeller fixed to said shaft adjacent said shaft lower end and supported within the upper part of said mesh cylinders, a gas discharge chamber within said shell adjacent said top, said shell having a plurality of vents communicating into said discharge chamber, a blower fixed to said shaft adjacent said top, said blower being positioned in said chamber and in air flow communication with air flowing along said tortuous pathway, water intake means extending into said shell adjacent and above the upper ends of said mesh cylinders, means for varying water intake, said intake means discharging onto said impeller, drive of said impeller diffusing water discharged thereon and casting said diffused water against said mesh cylinders for further dividing, said diffused and divided water being subjected to said air flow for removal of entrained gases therefrom to discharge from said discharge chamber.

References Cited in the file of this patent

UNITED STATES PATENTS

| | | |
|---|---|---|
| 916,146 | Gosline | Mar. 23, 1909 |
| 940,103 | Feld | Nov. 16, 1909 |
| 1,384,938 | Crane | July 19, 1921 |
| 1,979,630 | Lea | Nov. 6, 1934 |
| 2,046,895 | Delamere | July 7, 1936 |
| 2,153,932 | Lea | Apr. 11, 1939 |
| 2,889,005 | Umbricht | June 2, 1959 |